US010018984B2

(12) United States Patent
Ramiere et al.

(10) Patent No.: US 10,018,984 B2
(45) Date of Patent: Jul. 10, 2018

(54) METHOD AND SYSTEM FOR CONTROLLING THE MACHINING OF A PART BY A PORTABLE AUTOMATIC MACHINING APPARATUS

(71) Applicants: Airbus Operations (SAS), Toulouse (FR); European Aeronautic Defence and Space Company EADS France, Paris (FR)

(72) Inventors: Jean-Francois Ramiere, Saint Brevin (FR); Julie Duquesne, Saint Nazaire (FR); Bernard Pinson, Montoir de Bretagne (FR); Thomas Buisson, Clamart (FR)

(73) Assignee: Airbus Operations SAS, Toulouse (FR)

( * ) Notice: Subject to any disclaimer, the term of this patent is extended or adjusted under 35 U.S.C. 154(b) by 536 days.

(21) Appl. No.: 14/685,735

(22) Filed: Apr. 14, 2015

(65) Prior Publication Data
US 2015/0293518 A1  Oct. 15, 2015

(30) Foreign Application Priority Data

Apr. 14, 2014  (FR) ..................................... 14 53304

(51) Int. Cl.
*G05B 19/18* (2006.01)
*B23B 35/00* (2006.01)
*B23Q 11/12* (2006.01)

(52) U.S. Cl.
CPC ............ *G05B 19/182* (2013.01); *B23B 35/00* (2013.01); *B23B 2250/12* (2013.01); *B23Q 11/121* (2013.01); *G05B 2219/49043* (2013.01)

(58) Field of Classification Search
CPC ........ G05B 19/182; G05B 2219/49043; B23Q 11/121; B23B 35/00; B23B 2250/12
USPC ........................................................ 700/168
See application file for complete search history.

(56) References Cited

U.S. PATENT DOCUMENTS 5,267,141 A * 11/1993 Morita ..................... B23H 7/20
219/69.13
5,755,537 A     5/1998 Lubbering
6,557,651 B1 *  5/2003 Norby ................... E21B 17/006
175/52

(Continued)

OTHER PUBLICATIONS

French Search Report, dated Jan. 23, 2015.

*Primary Examiner* — Thomas C Lee
*Assistant Examiner* — Alan Chu
(74) *Attorney, Agent, or Firm* — Greer, Burns & Crain, Ltd.

(57) ABSTRACT

A method for controlling the machining of a part by a portable automatic machining apparatus. A machining tool configured to machine the part under the action of a pressurized fluid feeding the apparatus, and following a machining cycle, comprising a number of phases and a machining support equipment item. The machining support equipment item cooperates with the machining tool during the machining of the part. The method comprises the steps of measuring the pressure of the fluid at the outlet of the apparatus, analyzing the measured pressure to detect at least one phase of the cycle of machining of the part by the machining tool from the duly measured pressure, and controlling the machining support equipment item as a function of the phase of the machining cycle which has been detected.

17 Claims, 6 Drawing Sheets

(56) References Cited

U.S. PATENT DOCUMENTS

| | | | |
|---|---|---|---|
| 2005/0288816 A1* | 12/2005 | Kawasaki | G01B 13/16 700/175 |
| 2007/0137934 A1* | 6/2007 | Nappier | B23Q 11/1092 184/6.14 |
| 2010/0133009 A1* | 6/2010 | Carlson | E21B 44/06 175/45 |

* cited by examiner

METHOD AND SYSTEM FOR CONTROLLING THE MACHINING OF A PART BY A PORTABLE AUTOMATIC MACHINING APPARATUS

CROSS-REFERENCES TO RELATED APPLICATIONS

This application claims the benefit of the French patent application No. 10 1453304 filed on Apr. 14, 2014, the entire disclosures of which are incorporated herein by way of reference.

BACKGROUND OF THE INVENTION

The invention relates to a method for controlling the machining of a part by a portable automatic machining apparatus.

A machining apparatus generally comprises a machining tool which is configured to machine a part following a machining cycle comprising a number of phases such as:
- the approach of the tool towards the part from an initial position,
- the penetration of the tool into the part (machining or drilling),
- the exiting of the tool from the part,
- the withdrawal or retraction of the tool for it to revert to its initial position by making use of a mechanical abutment.

Conventionally, a lubricant is used during a machining cycle and the lubrication of the tool is performed continuously throughout the cycle, that is to say from the approach of the tool to its return to its initial position.

Thus, the lubrication continues even after the machining or drilling operation (when the tool has exited from the part) and during the return of the tool to its initial position.

This constitutes a source of pollution for the environment in which the machining is performed and represents a waste of lubricant.

Furthermore, a cloud of lubricant can be produced, which requires the operators to wear a protective mask.

SUMMARY OF THE INVENTION

The present invention aims to remedy at least one of the abovementioned drawbacks by proposing a method for controlling the machining of a part by a portable automatic machining apparatus, the machining apparatus comprising at least one machining tool which is configured to machine the part under the action of a pressurized fluid feeding the apparatus and following a machining cycle comprising a number of phases and at least one machining support equipment item, the at least one machining support equipment item cooperating with the at least one machining tool during the machining of the part, the control method being characterized in that it comprises the following steps:
- measuring the pressure of the fluid at the outlet of the apparatus,
- analyzing the measured pressure to detect at least one phase of the cycle of machining of the part by the at least one machining tool from the duly measured pressure,
- controlling the at least one machining support equipment item as a function of the at least one detected machining cycle phase.

The measurement of the pressure of the fluid (or of the variation in pressure of the fluid) which is used for the operation of the tool (gas or liquid) is representative of the phases of the machining cycle of the part. Thus, it is possible to deduce therefrom the current phase of the apparatus, knowing the pressure or pressure variation. Because of this, the knowledge of the phase of the cycle makes it possible to appropriately manage the lubrication of the tool and therefore to avoid the problems encountered in the prior art.

According to other features taken in isolation or in combination with one another:
- the step of controlling the at least one machining support equipment item is performed by sending a signal to an actuator which acts on the at least one machining support equipment item;
- the method comprises, prior to the pressure measurement step, a step called no-load cycle, of initialization of at least one reference value of at least one variable representative of a physical quantity involved in the machining of the part;
- the at least one variable is chosen from the time and the fluid pressure;
- the method comprises, from the pressure measured over time, a step of determining the first derivative of the pressure as a function of the time;
- the method comprises, from the pressure measured over time, a step of determining the second derivative of the pressure as a function of the time;
- the method comprises a step of comparing the second derivative of the pressure with a predetermined threshold value and, as a function of the result of the comparison, a step of detecting the start of machining which is characterized by the entry of the machining tool into the part;
- the method comprises a step of comparing the first derivative of the pressure with a predetermined threshold value and, as a function of the result of the comparison, a step of detecting the end of machining which is characterized by the exiting of the machining tool from the part;
- the method comprises a step of comparing a machining duration with a threshold value (tmax) measured during the no-load cycle step and, as a function of the result of the comparison, a step of detecting the end of machining which is characterized by the exiting of the machining tool from the part;
- the step of detecting the end of machining is followed by the step of controlling the at least one machining support equipment item.

Another object of the invention is a system for controlling the machining of a part, characterized in that it comprises:
- an automatic machining apparatus (portable or not) comprising at least one machining tool configured to machine the part following a machining cycle comprising a number of phases, at least one first machining support equipment item which comprises a spindle supporting the at least one machining tool, a unit for driving the movement of the spindle, a pressurized fluid feed for the apparatus and an output of fluid from the apparatus, the driving unit operating from the pressurized fluid feed of the apparatus,
- a pressure measuring unit configured and arranged to measure the pressure of the fluid at the outlet of the apparatus,
- a data processing unit configured to analyze the pressure measured by the pressure measuring unit to detect at least one phase of the cycle of machining of the part by the at least one machining tool from the duly measured pressure, a command/control unit configured to control the at least one machining support equipment item as a function of the at least one detected machining cycle phase.

According to other possible features taken in isolation or in combination with one another:
- the at least one machining support equipment item comprises a lubrication tank;
- the command/control unit is incorporated in a mobile multi-axial machine tool.

BRIEF DESCRIPTION OF THE DRAWINGS

Other features will become apparent from the following description, given purely as a nonlimiting example and with reference to the attached drawings, in which:

FIG. 1b is a detailed illustration of the machining apparatus of the system of FIG. 1a;

DETAILED DESCRIPTION OF THE PREFERRED EMBODIMENTS

As schematically represented in FIG. 1 and denoted by the general reference 10, a system for controlling the machining of a part comprises a portable automatic part machining apparatus 12 which is, for example, an apparatus used for drilling/boring parts.

Figure 1A:
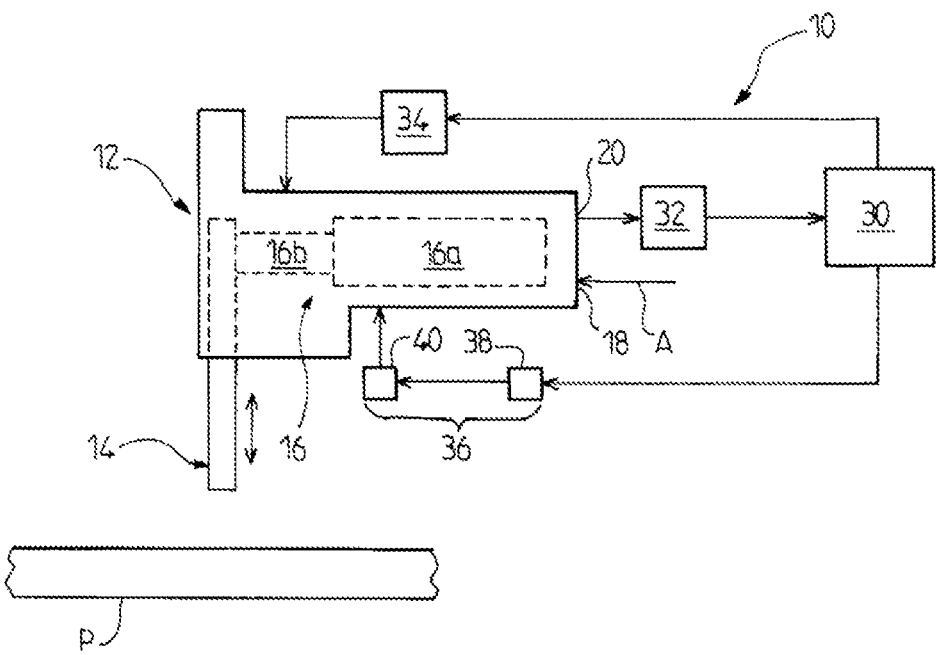
FIG. 1a is a schematic view of a system for controlling the machining of a part according to one embodiment of the invention.
Figure 1B:
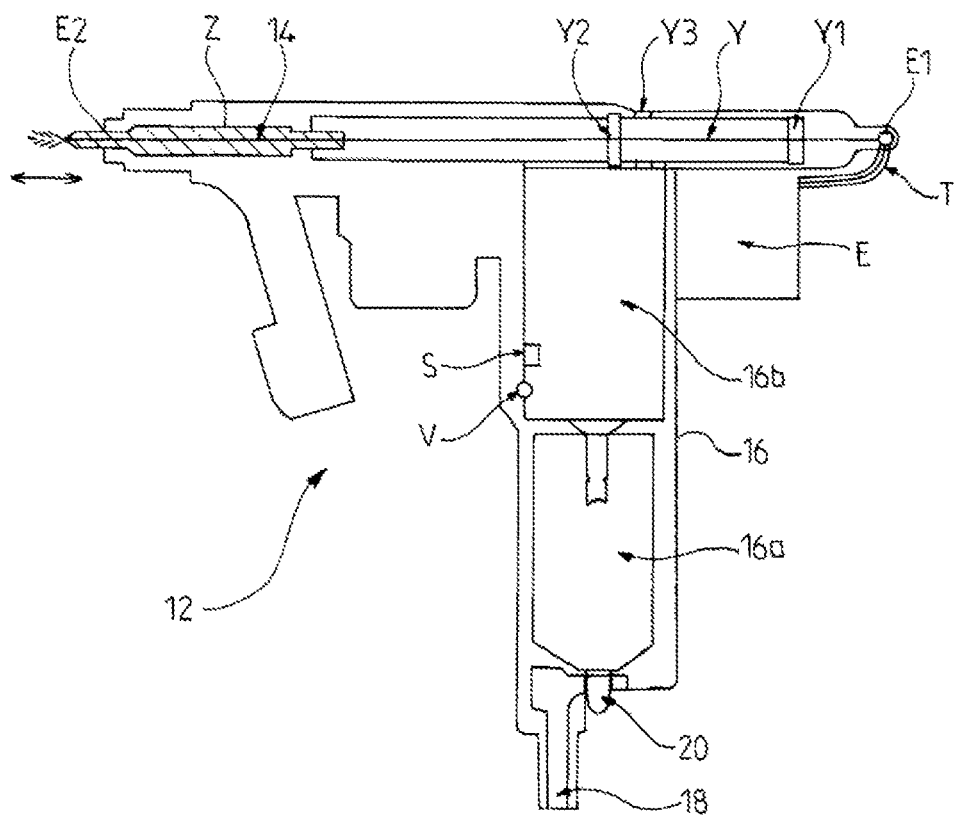

As illustrated in FIG. 1b, the portable automatic machining apparatus 12, here described by way of nonlimiting example, comprises a hollow tail stock Z which houses a machining tool 14 joined by one of its ends to a first machining support equipment item, called spindle Y, which is, for example, an axis, partially or totally threaded.

"Machining support equipment item" should be understood to mean an equipment item (mechanically incorporated in the apparatus or not) which cooperates functionally with the machining tool during the machining of a part by the tool. The tool is, for example, a cutting tool or a countersinking tool. The spindle Y supports a first abutment Y1, called front abutment, and a second abutment Y2, called rear abutment. A third abutment Y3, called fixed abutment, is present on an internal wall of the hollow tail stock Z, between the rear abutment and the front abutment.

The portable automatic machining apparatus 12 also comprises a driving unit 16 intended to drive the movement of the spindle Y and therefore the machining tool 14. The driving unit 16 comprises a pneumatic motor 16a, for example a turbine supplied with pressurized fluid and a mechanical assembly 16b, of gearing type (or a set of planetary gear sets), which links the turbine 16a to the spindle Y joined to the machining tool 14.

The portable automatic machining apparatus 12 comprises, in addition, an inlet 18 for receiving a pressurized fluid feed A. The pressurized fluid is necessary to the operation of the driving unit 16. The apparatus 12 comprises an outlet 20 for the fluid which has been used by the driving unit 16. The fluid is, for example, pressurized air.

The portable automatic machining apparatus 12 also comprises a control device S, for example a pushbutton, acting on the mechanical assembly 16b in order to displace the spindle Y until the rear abutment Y2 is in contact with the fixed abutment Y3. Thus, when a pressure is exerted on the pushbutton S, the machining tool 14 is brought back to the initial position.

The portable automatic machining apparatus 12 comprises a second machining support equipment item, namely a lubrication tank, referenced E in FIG. 1b, which can be embedded, as illustrated, or which can be sited remotely. An internal piston (not represented) and a coupling pipe T between the tank of lubricant E and a first end E1 of the hollow tail stock Z make it possible to bring the lubricant from the lubrication tank E to the machining tool 14. The lubricant circulates in the spindle Y and in the machining tool 14 and is discharged through an end of the machining tool 14 which is opposite to that joined to the spindle Y. A continuous pressure is applied to a locking mechanism V, making it possible to cut the lubrication of the machining tool 14.

The lubrication is also automatically stopped when the control device S is activated.

Under the action of the pressurized fluid, the turbine 16a starts to rotate and the mechanical assembly 16b converts the rotational movement of the output shaft (not represented) of the turbine 16a into a translational and rotational movement of the spindle Y and therefore of the machining tool 14. The movement comprises the axial displacement (translation) of the machining tool 14 (as indicated by the double arrow in FIG. 1b) and the rotation of the tool on itself for the machining of the part.

With the displacement of the spindle Y and of the machining tool 14, the front Y1 and rear Y2 abutments are displaced in the same direction as the machining tool 14. In one direction, called advance, the machining tool 14 exits from the hollow tail stock Z by a second end E2 and the displacement is stopped when the front abutment Y1 is in contact with the fixed abutment Y3 and, in the other direction, called retraction, the machining tool 14 goes back into the hollow tail stock Z by the second end E2 and the displacement is stopped when the rear abutment Y2 is in contact with the fixed abutment Y3.

Thus, the machining tool 14 is able to be displaced in an axial direction, in the two directions indicated by the double arrow in FIG. 1b, between an initial position, corresponding to the position of the tool when the rear abutment Y2 is in contact with the fixed abutment Y3, and a final position, corresponding to the position of the machining tool 14 when the front abutment Y1 is in contact with the fixed abutment Y3. In the initial position, the whole length of the machining tool 14 is in the hollow tail stock Z.

These various elements make it possible to advance or retract the machining tool 14 relative to a part P positioned on the path of displacement of the machining tool 14 as illustrated in FIG. 1a. Thus, the part can be machined by the machining tool 14 which is joined to the spindle Y (cutting tool for drilling or boring, countersinking tool for countersinking, combined cutting tool for drilling/boring/countersinking in one pass).

The machining of the part P, by such a portable automatic machining apparatus 12, is performed following a machining cycle which comprises a number of phases, namely:

a phase of approach and of simultaneous rotation of the tool 14 relative to the part P from an initial position, a phase of penetration of the tool 14 into the part P by a so-called entry face (drilling, or more generally machining, phase), a phase of exiting of the tool 14 from the part P during which the tool is cleared out of the part by a so-called exit face opposite the entry face, a phase of withdrawal or retraction of the tool (also called "spindle return") during which the tool 14 reverts to its initial position.

According to the invention, the control system 10 illustrated in FIG. 1a comprises a data processing unit 30 (e.g., microcontroller) which is configured to process input data and, from the duly processed data, to generate control commands (for example, in the form of electrical signals) to an actuator configured to actuate the machining support equipment items. The data processing unit 30 also comprises one or more memory areas for storing input data and data resulting from the processing.

The control system 10 also comprises a pressure measuring unit 32 configured to measure (the measurement is generally performed continuously) the pressure of the fluid at the outlet 20 of the apparatus 12, the pressure measuring unit being configured to deliver as output, to the processing unit 30, a pressure signal or a set of digital pressure values.

Advantageously, the control system 10 comprises a display screen (not illustrated) which informs the user about the current cycles (no-load cycle, drilling cycle, etc.).

The data processing unit 30 is configured notably to process the data supplied by the pressure measuring unit 32 (pressure signal or set of digital pressure values) and to detect, from these duly processed data, one or more phases of the machining cycle.

The system 10 comprises a number of command/control units which, on command from the processing unit 30, command/control the operation of one or more machining support equipment items of the apparatus 12. This control is slaved to the measurement of the pressure and to the detected phase of the machining cycle.

Generally, these command/control units comprise:

a wired link (e.g., electrical wire) between the processing unit 30 and an actuator such as a solenoid valve, which is controlled by a signal from the processing unit 30, a mechanism for actuating a machining support equipment item which is activated or implemented by the duly controlled actuator.

More particularly, the system 10 of FIG. 1a comprises:

a command/control unit 34 configured to command/control the operation of the lubrication tank E and a command/control unit 36 configured to command/control the operation of the spindle Y.

The command/control units 34 and 36 are of the same type and only the command/control unit 36 will be detailed hereinbelow.

The command/control unit 36 is configured to control the return of the spindle Y supporting the tool 14 or the stopping of the lubrication when the exiting of the machining tool from the part has been detected by the unit 30.

By way of example, the command/control unit 36 comprises a solenoid valve 38 linked by an electrical wire to the unit 30 and an actuator 40 linked to the solenoid valve. The processing unit 30 sends to the solenoid valve 38, via the electrical wire, a signal controlling the opening or the closing of the solenoid valve, thus allowing or preventing the passage of a fluid such as air (for example taken from the air circuit internal to the apparatus 12) for its injection into the actuator. The actuator 40 then acts on the mechanism for actuating the spindle Y, namely the control device S described above.

In parallel, the actuator of the command/control unit 34 is able to act on the mechanism for actuating the lubrication tank, namely the internal piston of the locking mechanism V described above.

Figure 2A:
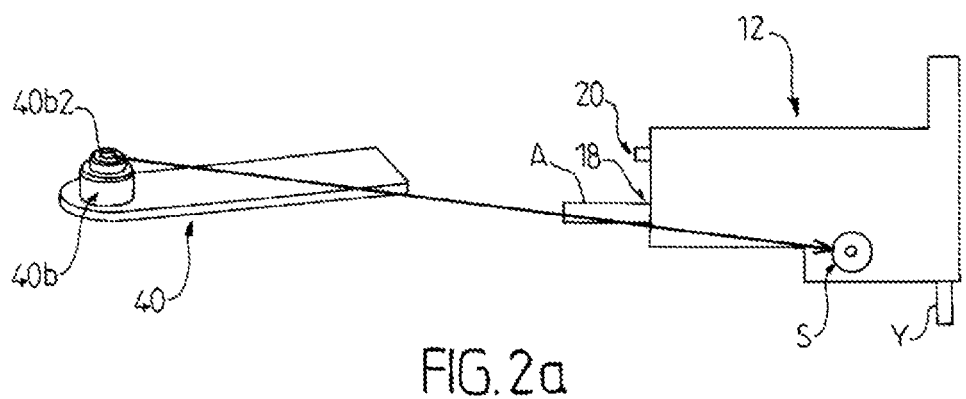
FIGS. 2a and 2b represent a command/control unit configured to control the retraction of the tool from the machining apparatus 12.
Figure 2B:
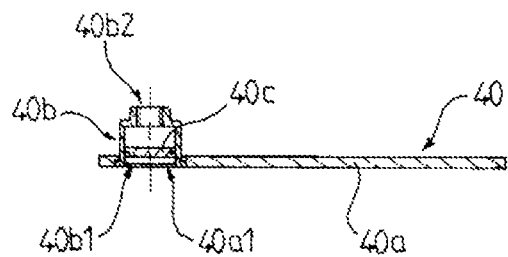

FIGS. 2a and 2b illustrate an exemplary embodiment of the command/control unit 36 for controlling the retraction of the spindle Y and therefore the return of the machining apparatus 14 which act indirectly on the operation of the driving unit 16.

As represented in FIG. 2a, the apparatus 12 comprises the actuation or control mechanism S (e.g., pushbutton), the actuation of which by depression controls the retraction of the tool 14 (return of the spindle; only the spindle Y is represented in FIG. 2a). In this example, the control is effected via the actuator 40 of FIG. 1a, which will mechanically simulate the pressing action performed manually by a user. The control is thus performed automatically as a function of the control commands sent by the processing unit 30.

This actuator for example takes the form represented in FIGS. 2a and 2b. The actuator comprises a base 40a pierced with a through orifice 40a1, on which a cylinder body 40b is mounted, inside which a piston-forming element 40c can slide in a leaktight manner via a radial seal. The body 40b is open at its two opposite ends to allow, at the end 40b1 which coincides with the through orifice 40a1, the supply of fluid (compressed air from the circuit of the apparatus) allowed by the solenoid valve 38 upon the sending of a stop command signal from the unit 30 (in order to fill the body and displace the piston 40c) and, at the opposite end 40b2, the passage of the air. The pressure of the air expelled through the end 40b is sufficient to press on the control device S. The base is of elongate form to allow a fixing element to be put in place on the outside of the body of the apparatus 12.

Figure 3A:
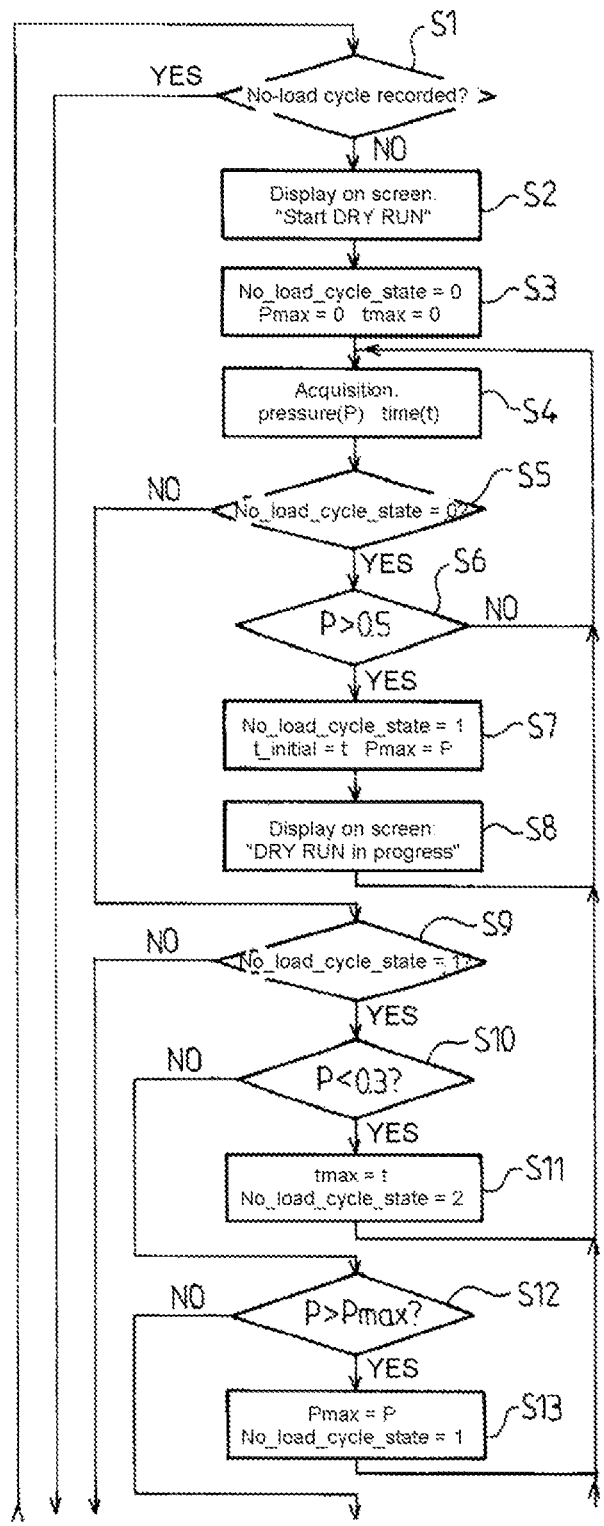
FIGS. 3a-c represent an algorithm for operation of a method for controlling the machining of a part according to one embodiment of the invention.
Figure 3B:
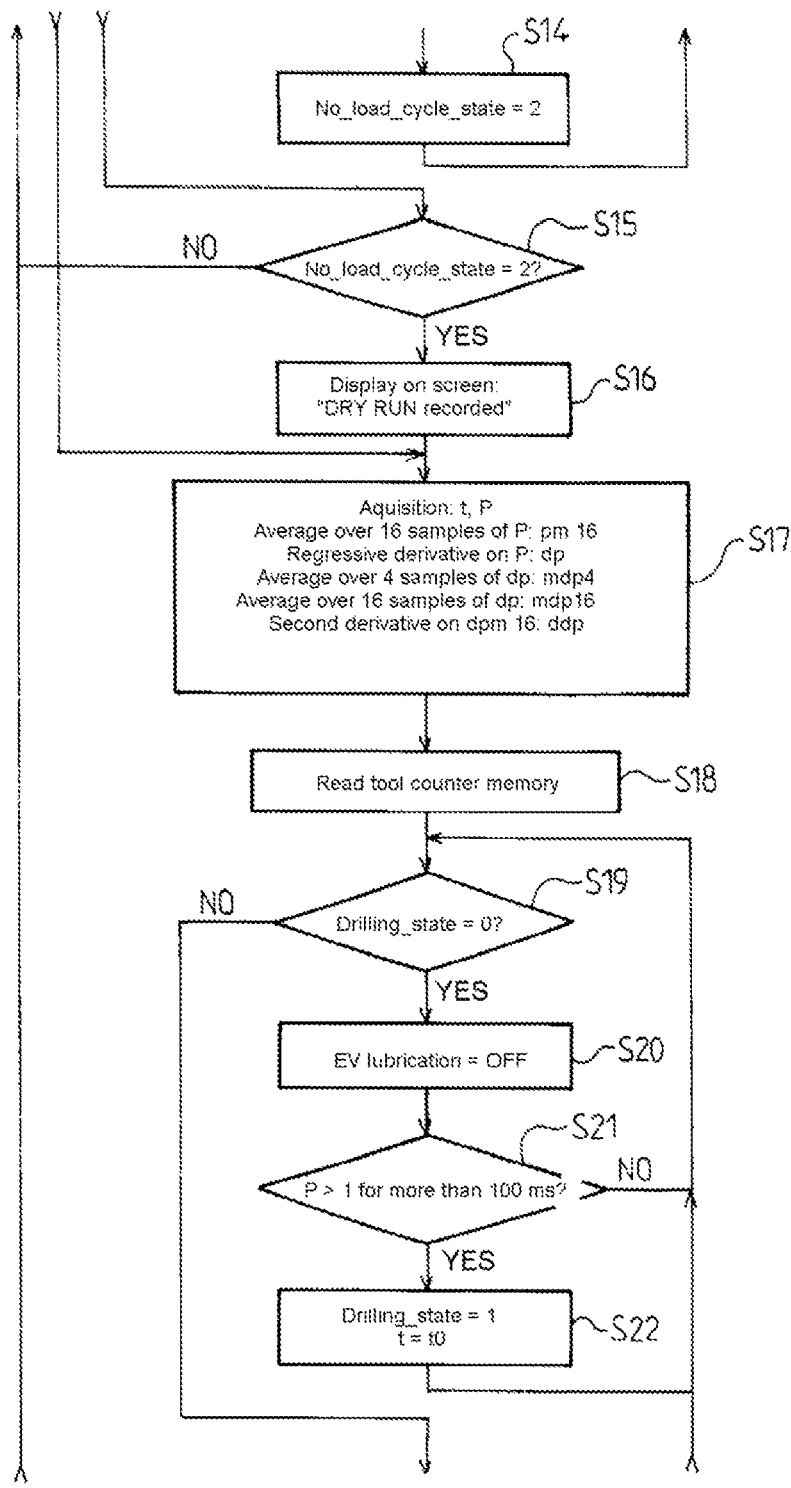
Figure 3C:
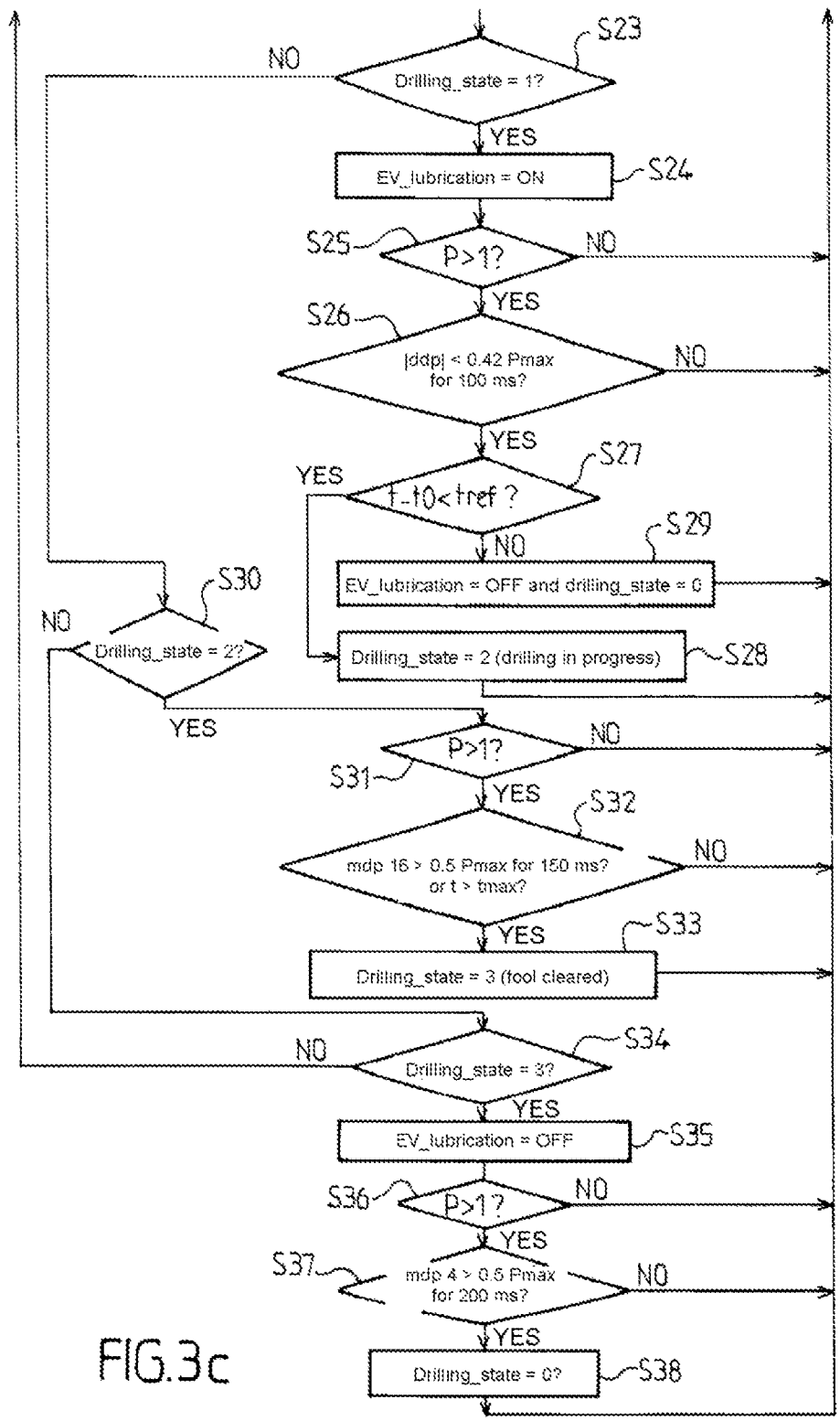

FIGS. 3a-c represent an algorithm for operation of the control system 10 which forms the basis for a method for controlling the machining of a part by the apparatus 12 according to one embodiment of the invention.

The algorithm is stored in the unit 30.

A number of input variables are used in this algorithm, namely:

the pressure P of the fluid (compressed air), which is an ongoing variable that is continuously measured and stored, the elapsed time of the current cycle t, which is an ongoing variable continuously measured and stored, the state of the current cycle, which is a discrete variable, the state of a machining support equipment item, which, in the example described here, is the lubrication tank and the corresponding state variable is called EV_lubrication.

More particularly, the state variable of the current cycle can correspond to:

the variable no_load_cycle_state while the no-load cycle is being performed and which takes the following values:

0 when there is no current no-load cycle 1 when the no-load cycle starts 2 when the no-load cycle is finished the drilling-state variable while a machining/drilling cycle is being performed, which takes the following values:

0 when there is no current drilling cycle 1 when the drilling cycle starts 2 when the drilling cycle is in progress 3 when the drilling cycle is finished and lubrication is no longer necessary.

In the exemplary embodiment described, two types of computation are performed on the pressure measurements carried out:

an average over 16 samples in order to smooth the curves and to be rid of aberrant values, an average over four samples in order to reduce the delay effect due to the computation performed on the basis of 16 samples and to obtain an instantaneous value of the variable.

The algorithm begins (FIG. 3a) with a first test step S1 in order to know whether the no-load cycle has already taken place.

If not, the following steps are performed:

S2: display, on the screen associated with the unit 30, of a message indicating that a no-load cycle will be performed, S3: initialization of the no_load_cycle_state variables Pmax and tmax to 0;

S4: acquisition of the pressure P measurements and of the time t for example at regular intervals, notably every 10 ms;

S5: test in order to know if the no_load cycle has not begun.

If the no_load_cycle_state variable takes the value 0, then the no-load cycle starts and the step S5 is followed by the step S6 of checking the value of the measured pressure P relative to a predetermined first threshold (e.g., 0.5 bar).

If P≤0.5 bar, the algorithm goes back to the step S4 already described because the pressure is insufficient.

If, on the contrary, P≥0.5 bar, the pressure is sufficient for the no-load cycle to start and the following steps are performed:

S7: the value of the no_load_cycle_state state variable changes to 1, and the value of the time of starting of the initial cycle is recorded as is the current pressure value Pmax;

S8: display, on the screen, of a message indicating that the no-load cycle is in progress.

The algorithm then continues with the step S4 already described.

Back to the checking step S5 described previously, when the no_load_cycle_state variable is different from 0, another test is performed in the next step S9 in order to determine whether this variable is equal to 1 (no-load cycle in progress).

If so, the next step S10 performs a check on the value of the measured pressure relative to a second predetermined threshold (e.g., 0.3 bar).

If P<0.3 bar, this means that the drilling is finished.

The next step S11 records the end of no-load cycle time tmax, which makes it possible to determine (and then record) the duration of the no-load cycle given the start time of the cycle recorded in the step S7.

The no_load_cycle_state variable then changes to 2 (cycle finished) and the step S11 is followed by the step S4 that has already been described.

It will be noted that a single no-load cycle is performed regardless of the number of hole drilling operations.

If, on the contrary, P≥0.3 bar, the step S9 is followed by the step S12, during which a check is carried out to ascertain if the pressure is greater than Pmax (pressure recorded in the step S7 during the no-load cycle).

If so, the new value of the measured pressure, which corresponds to the new value of Pmax, is recorded. Advantageously, the no_load_cycle_state variable is set to 1 (cycle finished) during the step S13 in order to secure its state.

The step S4 that has already been described is then performed again.

It will be noted that a number of fluid (compressed air) feed sets can be used and the number of sets connected to the feed circuit varies. The updating of the Pmax value makes it possible to be rid of these variations.

Back to the step S12, if P≤Pmax, the next step S14 sets the value of the no_load_cycle_state variable to 2 (cycle finished) and the step S4 that has already been described is performed again.

Back to the step S9, when the no_load_cycle_state variable is not equal to 1, this step is followed by the step S15 (FIG. 3b) for checking the value of this variable relative to the value 2 (no-load cycle finished).

If the value is not equal to 2, the no-load cycle is not finished and the algorithm returns to the step S1.

If, on the contrary, the value is equal to 2 (no-load cycle finished), the next step S16 displays, on the screen, a message indicating that the drilling cycle will begin.

The next step S17 constitutes the first step of the drilling cycle and performs the acquisition of the values of the pressure P and of the time t, for example at regular intervals, notably every 10 ms.

During this step, the following are computed:

the average of 16 pressure measurements, which is denoted pm16, the first derivative, dp, and second derivative, ddp, of the pressure, the average over 4 samples of the first derivative, denoted mdp4, the average over 16 samples of the first derivative, denoted mdp16.

The computation of the second derivative of the pressure makes it possible to install a machining tool 14, comprising a multi-stage drill bit, and to be rid of the pressure variations corresponding to the entries into the material and exits from the material by the different stages of the drill bit.

It will be noted that, when the test provided in the step S1 reveals that a no-load cycle is already recorded, this step is directly followed by the step S17.

The reading of the number of holes produced (one drilling cycle corresponds to the drilling of one hole) by the apparatus is performed from the memory of the counter of the apparatus in the next step S18.

The steps which will follow describe a loop of the algorithm, whose purpose is to check whether the drilling operations have begun.

The step S19 checks whether or not the drilling has begun.

If the drilling_state variable is at 0 (no drilling in progress), the step is followed by the step S20 of initialization of the EV_lubrication variable to the value OFF (no lubrication).

The next step S21 performs a check on the pressure P acquired over a predetermined duration in the interests of safety.

If P≤1 bar beyond a predetermined period, for example 100 ms, then the algorithm reverts to the step S19 that has already been described because the pressure is insufficient.

If, on the contrary, P>1 bar for longer than 100 ms, the pressure is considered sufficient to be able to trigger the lubrication and the drilling_state variable changes to 1 in the step S22 (confirmation of the start of the drilling cycle corresponding to the displacement of the spindle Y by the user). The current value of the time is stored in the memory 30 in a variable t0.

This step is then followed by the step S19 which has already been described.

When the test carried out in the step S19 reveals that the drilling_state variable is not equal to 0, the next step S23 (FIG. 3c) performs another test on the value of this variable.

If drilling_state=1, the next step S24 performs an update on the EV_lubrication variable to the value ON (lubrication implemented or engaged) and the various machining support equipment items are automatically started up. Thus, when the tool enters the part to be drilled, the lubrication is already initiated, which avoids any risk of entering the material before the lubrication begins.

During the step S25, a check is performed on the value of the measured pressure P in order to ensure that it is above a predetermined threshold, set for example at 1 bar (safety).

If this is not the case, the method reverts to the step S19 that has already been described because the insufficient pressure does not make it possible to activate the lubrication.

Otherwise, the method switches to the step S26 which performs a test on the value of the second derivative of the pressure.

More particularly, it determines whether the value ddp is below, for a predetermined period, for example 100 ms, a predetermined threshold which is, for example, a percentage of the pressure Pmax recorded in the no-load cycle.

The threshold is, for example, equal to 0.42 Pmax.

The value of this threshold is determined in a preliminary calibration phase on a reference part formed by a known stack and corresponds to the pressure variation when the tool enters the material, and therefore at the start of the drilling.

This test thus makes it possible to detect the pressure variation corresponding to the drilling start phase during the machining/drilling cycle. It should be noted that the first derivative makes it possible to identify the pressure variations corresponding to entry and exit of the tool. The first derivative is sufficient for a simple tool that has only a single drill bit stage but is not sufficient for a tool that has a number of drill bit stages. The second derivative of the pressure is then used for such a tool.

It will be noted that the figure of 42% corresponds to the metals machined, which are generally aluminum.

During the next step S27, the difference between the current value t of the time and the value t0 stored in the step S22 is computed and tested. It is compared with a time value tref, corresponding to the axial displacement of the tool 14 between its initial position and the entry into the material. This time value tref is determined during the calibration phase previously described.

If the difference (t−t0) is less than tref, the method proceeds to the step S28. If the different (t−t0) is greater than tref, this means that the tool 14 has not yet entered the material and that it is broken. The method then proceeds to the step S29, in which the lubrication_state variable is set to the value OFF (lubrication of the tool deactivated) and the drilling_state state variable is set to 0. In practice, the unit 30 of FIG. 1 sends a stop signal to the solenoid valve of the command/control unit 34 of FIG. 1a.

During the step S28, the drilling_state state variable is set to 2 (drilling in progress) and, optionally, the number of holes drilled by the apparatus is incremented and stored in the memory of the counter.

The step S28 is followed by the step S19 which has already been described.

Back to the step S23, when the drilling_state variable is not equal to 1, another test is performed (step S30) relative to the value 2.

If drilling_state=2 (drilling in progress), the next step S31 performs a check on the pressure P acquired in order to ensure that it is above a predetermined threshold, set for example at 1 bar (safety).

If this is not the case, the method reverts to the step S19 that has already been described because the insufficient pressure does not make it possible to activate the lubrication.

Otherwise, the method proceeds to the step S32 which performs a test on the value mdp16 (average over the values of the first derivative).

More particularly, it determines whether the value mdp16 is above, for a predefined time, for example 150 ms, a predetermined threshold which is, for example, a percentage of the pressure Pmax recorded during the no-load cycle.

The threshold is, for example, equal to 0.5 Pmax, which corresponds to the metals machined, generally aluminum.

The value of this threshold is determined during a preliminary calibration phase and corresponds to the pressure variation when the tool exits the material, and therefore at the end of drilling.

The predefined time is also determined during a preliminary calibration phase and makes it possible to be rid of the aberrant (abnormal) values of mdp16.

This test thus makes it possible to detect the end-of-drilling phase during the machining/drilling cycle (detection of full exit of the tool).

It will be noted that, when the condition concerning the value of mdp16 is not satisfied, an additional check is performed, during the step S32, on the time by comparing it with the duration tmax of the no-load cycle.

Thus, when the test in the step S32 shows that:

mdp16>0.5 Pmax for 150 ms, or that t>tmax, then the next step S33 performs an update on the drilling_state variable to the value 3 (drilling finished, the tool has exited from the material and the lubrication is therefore no longer necessary) and the method goes back to the step S19.

Back to the step S30, when the drilling_state state variable is not equal to 2, another test is performed in the step S34.

If the drilling_state variable is different from 3, the step S34 is followed by the step S1 which has already been described.

If the variable is equal to 3, this means that the lubrication is no longer necessary and the step S35 updates the lubrication_state variable to the value OFF (lubrication of the tool deactivated). In practice, the unit 30 of FIG. 1 sends a stop signal to the solenoid valve of the command/control unit 34 of FIG. 1a.

During the step S36, the value of the measured pressure P is checked relative to a predetermined threshold, for example equal to 1 bar (safety).

If the pressure is insufficient, the step is followed by the step S19 which has already been described.

If, on the contrary, P>1 bar, the next step S37 performs a test on the value mdp4 (instantaneous average) by adopting the same logic as that for the test in the step S32 (apart from the comparison with tmax).

More particularly, a check is performed to ascertain if mdp4 is above, for a predefined time (e.g.: 200 ms), a percentage of the pressure Pmax, for example set at 50%.

If so, the step S37 is followed by the step S38 of updating the drilling_state variable to 0 and the spindle (machining support equipment item) is activated by a stop signal sent to the corresponding solenoid valve in order to return the tool 14 to its initial position (tool retraction command).

The step S38 is followed by the step S19 which has already been described.

A new drilling can then be performed.

It will be noted that the detection of a change of material (for example in an aluminum/composite stack), and therefore the stopping of the lubrication of the tool, is performed in the loop for checking whether a drilling is finished.

During the calibration phase prior to the machining/drilling cycle, the pressure variation which occurs when the tool penetrates the material is recorded and the comparison threshold of mdp4 is adjusted accordingly.

It will be noted, generally, that the fluid feed pressure of the apparatus undergoes significant variations when the tool enters the material, upon a change of material during the machining and when the tool exits from the material.

These pressure variations are obtained from the measurement of the pressure and the computation of its first derivative and of its second derivative and thus make it possible, by comparison with predetermined thresholds, to detect different events such as a phase of the machining cycle (start and end of machining), a change of material, etc.

Figure 4:
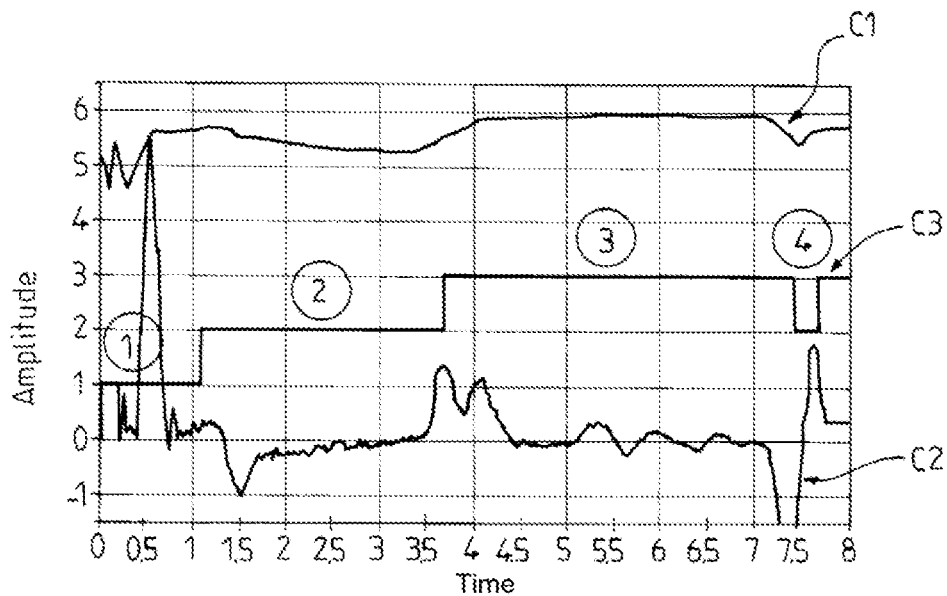
FIG. 4 represents, in a graph, the curves of the variations in the measured pressure, in the first derivative and in the second derivative of this pressure over time.

FIG. 4 represents, in one and the same graph, the variations in the measured pressure (curve C1), the variations in the first derivative of the pressure (curve C2) and the variations in the second derivative of the pressure (curve C3).

The curve C3 of the second derivative shows levels denoted 1 to 4 which correspond to different phases of the machining cycle performed by the apparatus once it has been started. When the apparatus is started, the machining tool 14 is not yet lubricated.

The level 1 corresponds to the rotation of the tool and the approach thereof to the entry face of the part to be machined.

The level 2 corresponds to the phase of actual machining of the constituent material of the part (drilling). During this phase, the tool is driven in rotation and advances into the material downwards (FIG. 1a). The control of the lubrication of the tool is implemented when the machining phase begins (tool penetrating the material). As mentioned above, the lubrication is controlled by virtue of the check performed on the compressed air pressure feeding the apparatus.

The level 3 corresponds to the phase during which the tool exits from the part by the exit face. The transition from the phase 2 to the phase 3 is detected by the increase in value of the second derivative of the pressure (ddp). The detection of this change of phase triggers the stopping of the lubrication.

The level 4 corresponds to an optional phase of countersinking, during which the part is countersunk, which is followed by the "automatic" spindle return (when the front abutment Y1 reaches the fixed abutment Y3), in order to return the tool 14 to its initial position.

Figure 5:
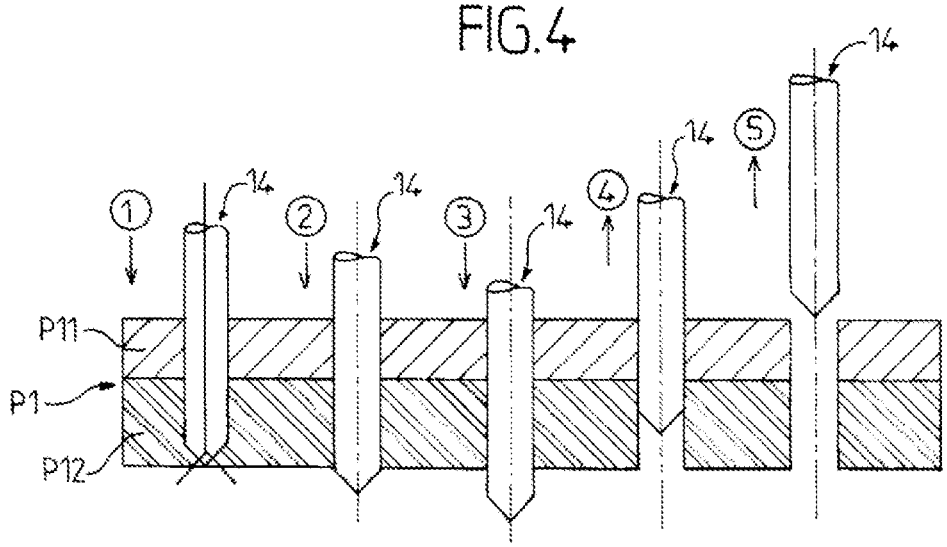
FIGS. 5 and 6 illustrate drilling in an assembly of two parts (FIG. 5) and in one part with different thicknesses (FIG. 6).

FIG. 5 illustrates the drilling of an assembly P1 of parts P11 and P12 by the tool 14 of FIGS. 1a-b. Five views arranged side by side, numbered 1 to 5, represent different successive positions of the tool during the machining/drilling cycle. The control of the drilling by the control system 10 of FIG. 1 makes it possible, as described above, to detect the exiting of the tool from the material by the exit face of the assembly P1. The detection of the clearance of the tool controls the stopping of the lubrication via the command/control unit 34 of FIG. 1a when the tool is in the second position (second view of FIG. 5).

Moreover, the detection of the exiting of the tool also controls the retraction/removal of the tool (spindle return) via the means 36 of FIGS. 1a-b and 2a-b, as illustrated by the last two positions in FIG. 5.

It will be noted that a change of material between the two parts P11 and P12 can be detected by the method described above.

Figure 6:
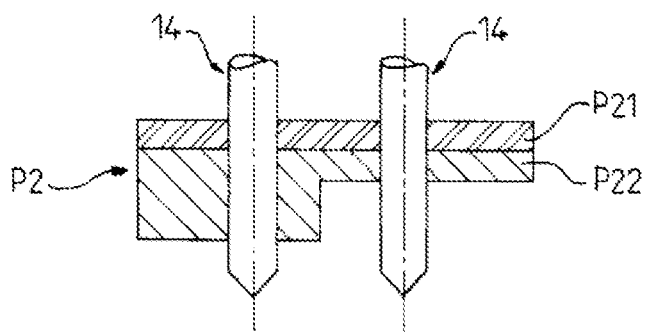

FIG. 6 illustrates the drilling, by the tool 14 of FIGS. 1a-b, of an assembly P2 of parts P21 and P22 having a difference in thickness. The control of the drilling by the control system 10 of FIG. 1a makes it possible, as described above, to detect the exiting of the tool from the material by the exit face of the part P2 and to control the return of the spindle and the stopping of the lubrication. Thus, the detection of exiting of the tool makes it possible to adapt the lubrication to the differences in thickness of the part with the same drilling tool.

Previously, the drilling travel of the tool was set for the greatest thickness of the part even if the tool was used to produce both drill-holes. The lubrication time was therefore longer than provided for the drilling in the portion of the part of smaller thickness because it was keyed to the drilling in the portion of the part of greater thickness. By virtue of the method described above, the detection of the exiting of the tool controls the stopping of the lubrication via the unit 30 and the command/control unit 34 of FIG. 1a.

Moreover, the detection of the exiting of the tool controls the retraction/removal of the tool 14, without having to wait for the mechanical end-of-travel abutment. This is particularly advantageous for the drilling of a bore in the portion of the part of reduced thickness.

It will be noted that previously it was necessary to change the drilling tool to perform the drilling of two portions of different thickness on one and the same part.

By virtue of the method, the same tool is used in as much as the thickness is the only parameter which varies between the two bores.

Although the machining method and the machining system 10 according to the invention have been described for a particular machining, namely drilling, modifications can be envisaged without changing the idea of the invention. Thus, there are as many state variables for the machining support equipment item as there are machining support equipment items and the spindle return is controlled according to the ON/OFF status of a spindle_state variable.

According to a variant embodiment, the command/control units 34, 36 are a mobile multi-axial machine tool comprising a main module, called controller, the machining system 10 according to the invention and the machining support equipment item or items. More particularly in this variant, the command/control units 34, 36 are in the main module.

According to a variant that is not represented, a machining system 10, for which the step S26 of the operation algorithm uses the average over 16 samples of the first derivative of the pressure instead of the average over 16 samples of the second derivative, is employed when the machining tool 14 comprises a single drill bit.

Very obviously, solenoid valves of "inverted" type can be used when the values taken by the state variables of the machining support equipment items are inverted.

According to a variant that is not represented, the means 30 are configured to measure a variation in the pressure of the fluid between the feed pressure at the inlet 18 of the apparatus and the pressure of the fluid at the outlet 20 of the apparatus.

The method described above from the measurement of the fluid outlet pressure retains the same functionalities in this variant.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for controlling the machining of a part by a portable automatic machining apparatus, the machining apparatus comprising at least one machining tool configured to machine the part under the action of a pressurized fluid feeding the apparatus and following a machining cycle comprising a number of phases and at least one machining support equipment item, said at least one machining support equipment item cooperating with said at least one machining tool during the machining of the part, the control method comprising the following steps:

measuring a pressure of the fluid at the outlet of the apparatus, analyzing the measured pressure to detect at least one phase of the cycle of machining of the part by said at least one machining tool from the duly measured pressure, controlling said at least one machining support equipment item as a function of said at least one detected machining cycle phase, determining, from the pressure measured over time, a first derivative of the pressure as a function of time, and, comparing the first derivative of the pressure with a predetermined threshold value and, as a function of the result of the comparison, detecting an end of machining which is characterized by an exiting of the machining tool from the part.

2. The method according to claim 1, wherein the step of controlling said at least one machining support equipment item is performed by sending a signal to an actuator which acts on said at least one machining support equipment item.

3. The method according to claim 1, further comprising, prior to the pressure measurement step, a no-load cycle step comprising initializing at least one reference value of at least one variable representative of a physical quantity involved in the machining of the part.

4. The method according to claim 3, wherein said at least one variable is chosen from time and the fluid pressure.

5. The method according to claim 3, further comprising a step of comparing a machining duration with a threshold value measured during the no-load cycle step and, as a function of the result of the comparison, a step of detecting an end of machining which is characterized by an exiting of the machining tool from the part.

6. The method according to claim 1, further comprising, from the pressure measured over time, a step of determining a second derivative of the pressure as a function of time.

7. The method according to claim 6, further comprising a step of comparing the second derivative of the pressure with a predetermined threshold value and, as a function of the result of the comparison, a step of detecting a start of machining which is characterized by an entry of the machining tool into the part.

8. The method according to claim 1, wherein the step of detecting the end of machining is followed by the step of controlling said at least one machining support equipment item.

9. A system for controlling the machining of a part, comprising:

an automatic machining apparatus comprising at least one machining tool configured to machine the part following a machining cycle comprising a number of phases, at least one first machining support equipment item which comprises a spindle supporting said at least one machining tool, a unit for driving the movement of the spindle, a pressurized fluid feed for the apparatus and an output of fluid from said apparatus, the driving unit operating from the pressurized fluid feed of the apparatus, a pressure measuring unit configured and arranged to measure a pressure of the fluid at an outlet of the apparatus, a data processing unit configured to: analyze the pressure measured by said pressure measuring unit to detect at least one phase of the cycle of machining of the part by said at least one machining tool from the duly measured pressure; prior to measuring said pressure, initialize a no-load cycle comprising at least one reference value of at least one variable representative of a physical quantity involved in the machining of the part; compare a machining duration with a threshold value measured during the no-load cycle, and, as a function of the result of the comparison, detect an end of machining which is characterized by an exiting of the machining tool from the part; and, a command/control unit configured to control said at least one machining support equipment item as a function of said at least one detected machining cycle phase.

10. The system according to claim 9, wherein said at least one first machining support equipment item comprises a lubrication tank.

11. The system according to claim 9, wherein the control/command unit is incorporated in a mobile multi-axial machine tool.

12. A method for controlling the machining of a part by a portable automatic machining apparatus, the machining apparatus comprising at least one machining tool configured to machine the part under the action of a pressurized fluid feeding the apparatus and following a machining cycle comprising a number of phases and at least one machining support equipment item, said at least one machining support equipment item cooperating with said at least one machining tool during the machining of the part, the control method comprising the following steps:

measuring a pressure of the fluid at the outlet of the apparatus, analyzing the measured pressure to detect at least one phase of the cycle of machining of the part by said at least one machining tool from the duly measured pressure, controlling said at least one machining support equipment item as a function of said at least one detected machining cycle phase, determining, from the pressure measured over time, a derivative of the pressure as a function of time, and, comparing the derivative of the pressure with a predetermined threshold value and, as a function of the result of the comparison, detecting: an end of machining which is characterized by an exiting of the machining tool from the part; a start of machining which is characterized by an entry of the machining tool into the part; or both.

13. The method according to claim 12, wherein the step of controlling said at least one machining support equipment item is performed by sending a signal to an actuator which acts on said at least one machining support equipment item.

14. The method according to claim 12, further comprising, prior to the pressure measurement step, a no-load cycle comprising initializing at least one reference value of at least one variable representative of a physical quantity involved in the machining of the part.

15. The method according to claim 14, wherein said at least one variable is chosen from time and the fluid pressure.

16. The method according to claim 12, further comprising a step of comparing a machining duration with a threshold value measured during the no-load cycle step and, as a function of the result of the comparison, a step of detecting an end of machining which is characterized by an exiting of the machining tool from the part.

17. The method according to claim 12, wherein the step of detecting the end of machining is followed by the step of controlling said at least one machining support equipment item.

* * * * *